2,802,018

METHOD OF RECOVERING METHYL BORATE FROM ADMIXTURE WITH METHANOL

Joseph C. Ton, Pittsburgh, Pa., assignor to Callery Chemical Company, Pittsburgh, Pa., a corporation of Pennsylvania No Drawing. Application October 29, 1953, Serial No. 389,150

4 Claims. (Cl. 260—462)

This invention relates to the separation of methyl borate $[B(OCH_3)_3]$ from mixtures of it, especially the azeotrope, with methanol ($CH_3OH$).

The common method of making methyl borate is to treat methanol with boric oxide ($B_2O_3$), boric acid ($H_3BO_3$), or borax ($Na_4B_2O_7$). This results in a liquid mixture of methyl borate and excess methanol. Simple distillation of such a mixture results in an azeotrope containing about 75 percent by weight of methyl borate, and like all azeotropes distillation procedures for recovering the pure components are protracted and complicated and therefore are not economically satisfactory operations.

Various expedients have been proposed for separating methyl borate from mixtures with methanol. One such procedure is that of washing the mixture, such as the azeotrope, with concentrated sulfuric acid ($H_2SO_4$). Methanol may be extracted from the azeotrope in this way but the procedure is not practical or economical where large quantities of methyl borate are to be produced because repeated extractions are required and substantial amounts of methyl borate are lost. Other procedures for the separation of methyl borate from $CH_3OH$ are described in a paper by H. I. Schlesinger et al. in 75 JACS 213. One involves adding to the azeotrope a substance which forms a second methanol azeotrope the boiling point of which is below that of the methanol-methyl borate azeotrope. The lower boiling azeotrope is then distilled away from the methyl borate. One such substance is carbon disulfide ($CS_2$) but this procedure is undesirable because of the extreme flammability of carbon disulfide and the toxicity of its vapor. Schlesinger et al. propose to separate methyl borate from methanol by the addition of salts that cause the mixture to separate into two layers. Examples of such salts are chlorides of lithium (LiCl), sodium (NaCl), calcium ($CaCl_2$), aluminum ($AlCl_3$), magnesium ($MgCl_2$) and zinc ($ZnCl_2$), as well as calcium nitrate $[Ca(NO_3)_2]$. Although methyl borate of high or relatively high purity may be made in this way, this procedure is likewise disadvantageous in that substantial amounts of methyl borate may be retained by the salt, with difficulty of recovery of the desired product.

It is among the objects of this invention to provide a simple method of recovering methyl borate from azeotropic mixtures with methanol, that is simple, that is practiced easily with readily available equipment, that is adapted to continuous operation, that provides methyl borate of high purity and with high efficiency, and that avoids or minimizes disadvantages of prior practices such as those referred to above.

Other objects will appear from the following specification.

This invention is predicated upon my discovery that upon mixing methyl borate-methanol azeotrope with a mineral oil, the methyl borate goes into solution in the mineral oil with the formation of two liquid layers, one being composed of the mineral oil solution of methyl borate and the other of methanol, and further that the mineral oil layer may then be flash distilled to recover the methyl borate. In the preferred practice of the invention the methyl borate thus recovered is then subjected to fractionation in a column with the pure methyl borate being taken off at the bottom of the column, and if any methanol is present in the feed it is taken off overhead in the form of an azeotrope which may then be recycled for further treatment in the same way.

I find that in this way methyl borate of 100 percent purity may thus be recovered easily, inexpensively, efficiently and rapidly.

The invention is applicable furthermore to continuous operation in which the stripped oil from the initial, e. g. flash, distillation is cooled and recycled.

As an example of the practice of the invention, in one run there was used a branch chain aliphatic oil sold as Penn-Drake No. 10 and having the following specifications:

| | |
|---|---|
| Viscosity at 100° F | 95/105 |
| Specific gravity at 77° F./25° C | .855/.865 |
| A. S. T. M. cloud | 0 |
| A. S. T. M. pour | −15 |
| Color Saybolt min | +30 |
| Flash open cup | 350° F. |
| Fire open cup | 395° F. |

Methyl borate-methanol azeotrope was mixed with an equal amount of the foregoing oil and pumped into a decanter in which the two layers separated. The lower, oil layer in which the methyl borate had been dissolved was taken off continuously and flash distilled. The stripped oil was then cooled and pumped back to the decanter. The vapors from the flash distillation were fed into a 2-inch Pyrex packed column. The methyl borate was taken off at the bottom, and any alcohol in the oil feed was removed as azeotrope overhead. This resulted in the production of methyl borate of 100 percent purity. The operating conditions were as follows:

| | |
|---|---|
| Oil to azeotrope ratio: | One to one. |
| Temperature of flash evaporator | 250° C. |
| Temperature of reboiler | 64.8° C. |
| Temperature of condenser | 54° C. |
| Purity of product | 100%. |
| Specific gravity of product at 30° C | .920. |
| Reflux ratio of packed coil | Two to one. |
| Overhead analysis | Azeotrope. |
| Oil temperature entering decanter | 44° C. |
| Oil temperature entering flash evaporator | 30° C. |

Although the invention has been exemplified with reference to a specific mineral oil, it will be understood that other mineral oils in which methyl borate is soluble and methanol is substantially insoluble may be equally used.

According to the provisions of the patent statutes, I have explained the principle and mode of practicing my invention and have described what I now consider to represent its best embodiment. However, I desire to have it understood that, within the scope of the appended claims, the invention may be practiced otherwise than as specifically described.

I claim:

1. That method of separating methyl borate from an azeotrope with methanol comprising mixing the azeotrope with mineral oil, settling the mixture to form a layer comprising a solution of methyl borate in mineral oil and a methanol layer, separating the mineral oil layer from the methanol layer, subjecting the mineral oil layer to distillation to drive off the methyl borate, passing the methyl borate to a fractionating column, taking off methyl borate from the bottom of said column, and taking off as overhead from the column in the form of azeotrope with methyl borate any methanol present in the feed to the column.

2. A method according to claim 1, the oil from said distillation being recycled for treatment of the azeotrope according to said claim.

3. A method according to claim 1, said azeotrope overhead being recycled for further treatment with said mineral oil according to said claim.

4. A method according to claim 1, the oil from said distillation and said overhead azeotrope being recycled for further treatment in accordance with said claim.

References Cited in the file of this patent

UNITED STATES PATENTS

| | | |
|---|---|---|
| 1,624,810 | Suida | Apr. 12, 1927 |
| 2,262,187 | Lytle et al. | Nov. 11, 1941 |
| 2,542,752 | Cole | Feb. 20, 1951 |

UNITED STATES PATENT OFFICE

CERTIFICATE OF CORRECTION

Patent No. 2,802,018            August 6, 1957

Joseph C. Ton

It is hereby certified that error appears in the printed specification of the above numbered patent requiring correction and that the said Letters Patent should read as corrected below.

Column 1, line 20, for "$(Na_4B_2O_7)$" read -- $(Na_2B_4O_7)$ --.

Signed and sealed this 3rd day of December 1957.

(SEAL)

Attest:

KARL H. AXLINE            ROBERT C. WATSON
Attesting Officer         Commissioner of Patents